(12) United States Patent
Kiyohara et al.

(10) Patent No.: US 6,304,683 B1
(45) Date of Patent: Oct. 16, 2001

(54) IMAGE SCANNING APPARATUS, METHOD OF SCANNING IMAGES, AND RECORDING MEDIUM FOR REALIZING THE METHOD

(75) Inventors: Satoru Kiyohara; Kunio Muraji, both of Kyoto (JP)

(73) Assignee: Dainippon Screen Mfg. Ltd. (JP)

( * ) Notice: Subject to any disclaimer, the term of this patent is extended or adjusted under 35 U.S.C. 154(b) by 0 days.

(21) Appl. No.: 09/716,606

(22) Filed: Nov. 20, 2000

Related U.S. Application Data

(63) Continuation of application No. 09/033,027, filed on Mar. 2, 1998, now Pat. No. 6,175,649.

(30) Foreign Application Priority Data

Mar. 7, 1997 (JP) .......................................... 9-70798

(51) Int. Cl.$^7$ .................................................. G06K 9/20
(52) U.S. Cl. ........................... 382/317; 358/486; 382/167
(58) Field of Search .................................... 382/167, 282, 382/299, 312, 317, 318, 319, 321, 323; 358/486

(56) References Cited

U.S. PATENT DOCUMENTS 5,048,106 * 9/1991 Nakajima et al. .................... 382/298
5,060,283 * 10/1991 Shiraishi ............................... 382/321
5,359,677 * 10/1994 Katsurada et al. ................... 382/290

* cited by examiner

Primary Examiner—Timothy M. Johnson
(74) Attorney, Agent, or Firm—Ostrolenk, Faber, Gerb & Soffen, LLP (57) ABSTRACT

An image scanning technique of the present invention shortens the time required for reading images of a plurality of originals set on an original tray. The positions of a lens 18 and a line of CCDs 20 are adjusted, so as to enable a scanning range of the line of CCDs 20 in a primary scanning direction to cover a plurality of originals. A first shooting range Z1 of the line of CCDs 20 covers four trimming areas Tr1,Tr2, Tr5, and Tr6. The procedure of the image scanning technique first reads white reference data of a white reference plate in the first shooting range Z1, then scans the four trimming areas Tr1, Tr2, Tr5, and Tr6 while fixing the shooting range to the first shooting range Z1, and carries out shading correction to correct image data obtained by the scan with the white reference data. This structure requires the process of scanning the white reference plate and updating the white reference data only once for correcting the image data of the plurality of originals.

6 Claims, 7 Drawing Sheets

| TRIMMING AREAS | SEQUENCE | ANGLE OF VIEW $\theta$ | POSITION IN PRIMARY SCANNING DIRECTION |
|---|---|---|---|
| Tr1 | 1 | 30 | 0 |
| Tr2 | 2 | 30 | 0 |
| Tr3 | 5 | 25 | 100 |
| Tr4 | 6 | 25 | 100 |
| Tr5 | 3 | 30 | 0 |
| Tr6 | 4 | 30 | 0 |

TO NEXT SCANNING LINE

Fig. 7(b)

CORRESPONDING TO ONE LINE

Fig. 7(c) SHADING CORRECTION

Fig. 7(d)

IMAGE SCANNING APPARATUS, METHOD OF SCANNING IMAGES, AND RECORDING MEDIUM FOR REALIZING THE METHOD

CROSS-REFERENCE TO RELATED APPLICATIONS

This is a continuation of application Ser. No. 09/033,027, filed Mar. 2, 1998 now U.S. Pat. No. 6,175,649.

BACKGROUND OF THE INVENTION

1. Field of the Invention

The present invention relates to a technique for scanning originals with an image sensor, such as CCDs (charge-coupled devices).

2. Description of the Related Art

An image scanning apparatus generally illuminates an original with light and introduces light reflected from the original (or transmitted through the original) into a first-dimensional CCDs, in order to read image signals of the original from the first-dimensional CCDs. The respective elements of the first-dimensional CCDs do not have identical sensitivity characteristics. Even when light enters all the elements homogeneously, there is a scatter in the output level of the elements. Shading correction is a typical procedure to correct the scatter in the sensitivity characteristics of the respective elements of the one-dimensional CCDs. The process of shading correction scans a white reference plate (or a black reference plate) prior to the scan of the original, and generates coefficient data used for correcting the sensitivities of the respective elements of the one-dimensional CCDs, based on the output signals with respect to the reference plate from the one-dimensional CCDs. The process of shading correction corrects the output signals of an image obtained by scanning the original with the coefficient data.

It is here assumed that a plurality of originals are set on an original tray. The plurality of originals have different scanning resolutions and different widths. It is accordingly required to set a scanning angle of the one-dimensional CCDs for each original. The 'scanning angle' here represents an angle of a possible shooting range of the first-dimensional CCDs. The coefficient data used for correcting the sensitivities depend upon the scanning angle of the one-dimensional CCDs. The prior art technique accordingly carries out the shading correction for each of the plurality of originals set on the original tray, prior to the scan of the original.

As mentioned above, the prior technique requires the shading correction every time when the target of the scan is moved to a next original among the plurality of originals set on the original tray. This means that the process of scanning the white reference plate and updating the coefficient data used for correcting the sensitivities should be carried out for each original. This undesirably lengthens the total time required for scanning images.

SUMMARY OF THE INVENTION

The object of the present invention is thus to shorten the total time required for scanning images of a plurality of originals set on an original tray.

The above and the other related objects is realized by a first image scanning apparatus for optically scanning images of a plurality of originals set on an original tray, the first image scanning apparatus including: a light source which illuminates each of the original; a lens which condenses light from the each of original to condensed light; and a liner image sensor, arranged at a position of concentration of the condensed light, comprising a plurality of light-receiving elements arrayed in a primary scanning direction for converting light to electrical signals.

The first image scanning apparatus further includes:

a scanning range specifying unit which adjusts relative positions of the lens, the liner image sensor and the original tray so that a scanning range of the linear image sensor in the primary scanning direction includes at least two of the plurality of originals;

a color reference data generating unit which obtains an output signal of the linear image sensor for a preset color reference while the scanning range of the linear image sensor is fixed to what has been specified by the scanning range specifying unit, and generating color reference data for correcting sensitivity of each light-receiving element of the linear image sensor on the basis of the output signal;

a secondary scanning unit which moves the original tray relative to the linear image sensor in a secondary scanning direction while the scanning range of the linear image sensor is fixed to what has been specified by the scanning range specifying unit; and an electrical signal correction unit which corrects an electrical signal, which is output from the linear image sensor as the original tray is moving in the secondary scanning direction, with the color reference data generated by the color reference data generating unit.

In the first image scanning apparatus of the present invention, the scanning range specifying unit adjusts the relative positions of the optical lens, the linear image sensor and original tray, so that a scanning range of the linear image sensor in the primary scanning direction includes at least two of the plurality of originals. While the scanning range of the linear image sensor is fixed to what has been specified by the scanning range specifying unit, the color reference data is generated by the color reference data generating unit, and the images of at least two originals are read by the linear image sensor as the original tray is moving in the secondary scanning direction. The electrical signal correction unit corrects the electrical signals output from the linear image sensor as the color reference data. Namely the same color reference data generated by the color reference data generating unit can be applied to correct the electrical signals representing the images of at least two originals.

This structure effectively reduces the generating cycles of the color reference data used for correcting the sensitivities of the linear image sensor to be less than the number of the originals, thereby shortening the total time required for scanning the plurality of originals set on the original tray.

In accordance with one preferable application, the secondary scanning unit successively scans at least two originals one by one in the secondary scanning direction while the scanning range of the linear image sensor is fixed to what has been specified by the scanning range specifying unit. In this application, the first image scanning apparatus further includes:

a data extraction unit which extracts image data of an original currently being scanned by the secondary scanning unit from the electrical signal corrected with the color reference data; and a memory which stores the extracted image data.

In this preferable structure, the secondary scanning unit successively reads at least two originals one by one in the secondary scanning direction. The required capacity of the memory accordingly corresponds to the image data of one original. This structure reduces the required capacity of the memory for storing the image data.

In accordance with another preferable application, the first image scanning apparatus further includes a pre-scan unit which scans a whole image representing all the plurality of originals set on the original tray at a predetermined resolution. In this application, the scanning range specifying unit includes:

a computation unit which specifies an angle of view of the linear image sensor and a specific position of the linear image sensor in the primary scanning direction to attain the scanning range, on the basis of the whole image obtained by the pre-scan unit; and an optical system shifting unit which adjusts the relative positions of the lens, the linear image sensor and the original tray in order to attain the angle of view and the specific position specified by the computation unit.

In the first image scanning apparatus of this structure, it is preferable that the computation unit includes:

a trimming unit which specifies an effective range of each of the original as a trimming area of each of the original, on the basis of the whole image obtained by the pre-scan unit; and a unit which calculates an angle of view and the specific position of the linear image sensor from the trimming area of each of the original specified by the trimming unit.

In the first image scanning apparatus of the above preferable structure, the secondary scanning unit successively scans the at least two originals one by one in the secondary scanning direction while the scanning range of the linear image sensor is fixed to what has been specified by the scanning range specifying unit. In this application, the first image scanning apparatus further includes:

a data extraction unit which extracts image data included in the trimming area with respect to an original currently being scanned by the secondary scanning unit from the electrical signal corrected with the color reference data; and a memory which stores the extracted image data.

In accordance with one preferable structure, the trimming area is a rectangular area specified by an operator with a pointing device.

In accordance with another preferable structure, the scanning range specifying unit further includes a memory which stores first data representing the trimming area, second data representing the angle of view specified by the computation unit, and third data representing the specific position of the linear image sensor in the primary scanning direction specified by the computation unit with respect to each original.

The present invention is also directed to a second image scanning apparatus for optically scanning images of at least one original set on an original tray, the second image scanning apparatus including: a light source which illuminates each of the original; a lens which condenses light from each of the original to condensed light; and a linear image sensor, arranged at a position of concentration of the condensed light, comprising a plurality of light-receiving elements arrayed in a primary scanning direction for converting light to electrical signals.

The second image scanning apparatus further includes:

an original specification unit which specifies a resolution and a position of each of the original set on the original tray;

a scanning range setting unit which sets a scanning range of the linear image sensor in the primary scanning direction to a range that maximizes a number of originals included in the scanning range and enables each of the original to be scanned at a resolution of not lower than the resolution specified by the original specification unit, on the basis of the resolution and the position of each of the original;

an optical system shifting unit which adjusts relative positions of the lens, the linear image sensor and the original tray, in order to realize the scanning range set by the scanning range setting unit; and a secondary scanning unit which moves the original tray relative to the liner image sensor in a secondary scanning direction while the scanning range of the linear image sensor is fixed to what has been realized by the optical system shifting unit.

In the second image scanning apparatus of the present invention, the original specification unit specifies a resolution and a position of each original set on the original tray. The scanning range of the linear image sensor in the primary scanning direction depends upon the resolution and the position of the original. The scanning range of the linear image sensor maximizes the number of originals included in the scanning range and enables each original to be scanned at a resolution of not lower than the resolution specified by the original specification unit. While the scanning range of the linear image sensor is fixed to what has been realized by the optical system shifting unit, the images of the maximum number of originals included in the range are read by the linear image sensor as the original tray is moving in the secondary scanning direction. Namely this structure enables the maximum number of originals to be scanned without causing deterioration of the resolution, while the scanning range of the linear image sensor in the primary scanning direction is fixed to what has been realized by the optical system shifting unit.

This structure effectively reduces the number of driving the optical system shifting unit to be less than the number of the originals, thereby shortening the total time required for scanning the plurality of originals set on the original tray.

The present invention is further directed to a first method of optically scanning images of a plurality of originals set on an original tray with an image scanning device, the image scanning device including: a light source which illuminates each of the original, a lens which condenses light from each of the original to condensed light, and a linear image sensor, arranged at a position of concentration of the condensed light, comprising a plurality of light-receiving elements arrayed in a primary scanning direction for converting light to electrical signals.

The first method includes the steps of:

(a) adjusting relative positions of the lens, the linear image sensor and the original tray so that a scanning range of the linear image sensor in the primary scanning direction includes at least two of the plurality of originals;

(b) obtaining an output signal of the linear image sensor for a preset color reference while the scanning range of the linear image sensor is fixed to what has been specified in the step (a), and generating color reference data for correcting sensitivity of each light-receiving element of the linear image sensor on the basis of the output signal;

(c) moving the original tray relative to the linear image sensor in a secondary scanning direction while the scanning range of the linear image sensor is fixed to what has been specified in the step (a); and (d) correcting an electrical signal, which is output from the linear image sensor as the original tray is moving in the secondary scanning direction, with the color reference data generated in the step (b).

Like the first image scanning apparatus discussed above, the first method of the present invention requires the process of generating the color reference data only once for correcting the image data of at least two originals. This structure effectively reduces the generating cycles of the color reference data used for correcting the sensitivities of the linear image sensor to be less than the number of the originals, thereby shortening the total time required for scanning the plurality of originals set on the original tray.

The present invention is also directed to a second method of optically scanning images of at least one original set on an original tray with an image scanning device, the image scanning device including: a light source which illuminates each of the original, a lens which condenses light from each of the original to condensed light, and a linear image sensor arranged at a position of concentration of the condensed light comprising a plurality of light-receiving elements arrayed in a primary scanning direction for converting light to electrical signals.

The second method includes the steps of:

(a) specifying a resolution and a position of each of the original set on the original tray;

(b) setting a scanning range of the linear image sensor in the primary scanning direction to a range that maximizes a number of originals included in the scanning range and enables each of the original to be scanned at a resolution of not lower than the resolution specified in the step (a), on the basis of the resolution and the position of each of the original;

(c) adjusting relative positions of the lens, the linear image sensor and the original tray, in order to realize the scanning range set in the step (b); and (d) moving the original tray relative to the linear image sensor in a secondary scanning direction while the scanning range of the linear image sensor is fixed to what has been realized in the step (c).

Like the second image scanning apparatus discussed above, the structure of the second method effectively reduces the number of adjusting the positions of the optical system to be less than the number of the originals, thereby shortening the total time required for scanning the plurality of originals set on the original tray.

The present invention also provides a first computer program product for optically scanning images of a plurality of originals set on an original tray with an image scanning device, the image scanning device including: a light source which illuminates each of the original, a lens which condenses light from each of the original to condensed light, and a linear image sensor, arranged at a position of concentration of the condensed light, comprising a plurality of light-receiving elements arrayed in a primary scanning direction for converting light to electrical signals.

The first computer program product includes:

a computer-readable medium;

a first program code unit for causing a computer to adjust relative positions of the lens, the linear image sensor and the original tray so that a scanning range of the linear image sensor in the primary scanning direction includes at least two of the plurality of originals;

a second program code unit for causing the computer to obtain an output signal of the linear image sensor for a preset color reference while the scanning range of the linear image sensor is fixed to what has been specified by the first program code unit, and to generate color reference data for correcting sensitivity of each light-receiving element of the linear image sensor on the basis of the output signal;

a third program code unit for causing the computer to move the original tray relative to the linear image sensor in a secondary scanning direction while the scanning range of the linear image sensor is fixed to what has been specified by the first program code unit; and a fourth program code unit for causing the computer to correct an electrical signal, which is output from the linear image sensor as the original tray is moving in the secondary scanning direction, with the color reference data generated by the second program code unit, wherein each of the program code units is recorded on the computer-readable medium.

Like the first image scanning apparatus and the first method discussed above, the first computer program product carried out by the computer effectively reduces the generating cycles of the color reference data used for correcting the sensitivities of the linear image sensor to be less than the number of the originals, thereby shortening the total time required for scanning the plurality of originals set on the original tray.

The present invention is further directed to a second computer program product for optically scanning images of at least one original set on an original tray with an image scanning device, the image scanning device including: a light source which illuminates each of the original, a lens which condenses light from each of the original to condensed light, and a linear image sensor arranged at a position of concentration of the condensed light comprising a plurality of light-receiving elements arrayed in a primary scanning direction for converting light to electrical signals.

The second computer program product includes:

a computer-readable medium;

a first program code unit for causing a computer to specify a resolution and a position of each the original set on the original tray;

a second program code unit for causing the computer to set a scanning range of the linear image sensor in the primary scanning direction to a range that maximizes a number of originals included in the scanning range and enables the each original to be scanned at a resolution of not lower than the resolution specified by the first program code unit, on the basis of the resolution and the position of each of the original;

a third program code unit for causing the computer to adjust relative positions of the optical lens, the linear image sensor and the original tray, in order to realize the scanning range set by the second program code unit; and a fourth program code unit for causing the computer to move the original tray relative to the linear image sensor in a secondary scanning direction while the scanning range of the linear image sensor is fixed to what has been realized by the third program code unit, wherein each of the program code units is recorded on the computer-readable medium.

Like the second image scanning apparatus and the second method discussed above, the second computer program product carried out by the computer effectively reduces the number of adjusting the positions of the optical system to be less than the number of the originals, thereby shortening the total time required for scanning the plurality of originals set on the original tray.

These and other objects, features, aspects, and advantages of the present invention will become more apparent from the following detailed description of the preferred embodiments with the accompanying drawings.

DESCRIPTION OF THE PREFERRED EMBODIMENTS

One mode of carrying out the present invention is discussed below as a preferred embodiment.

Figure 1:
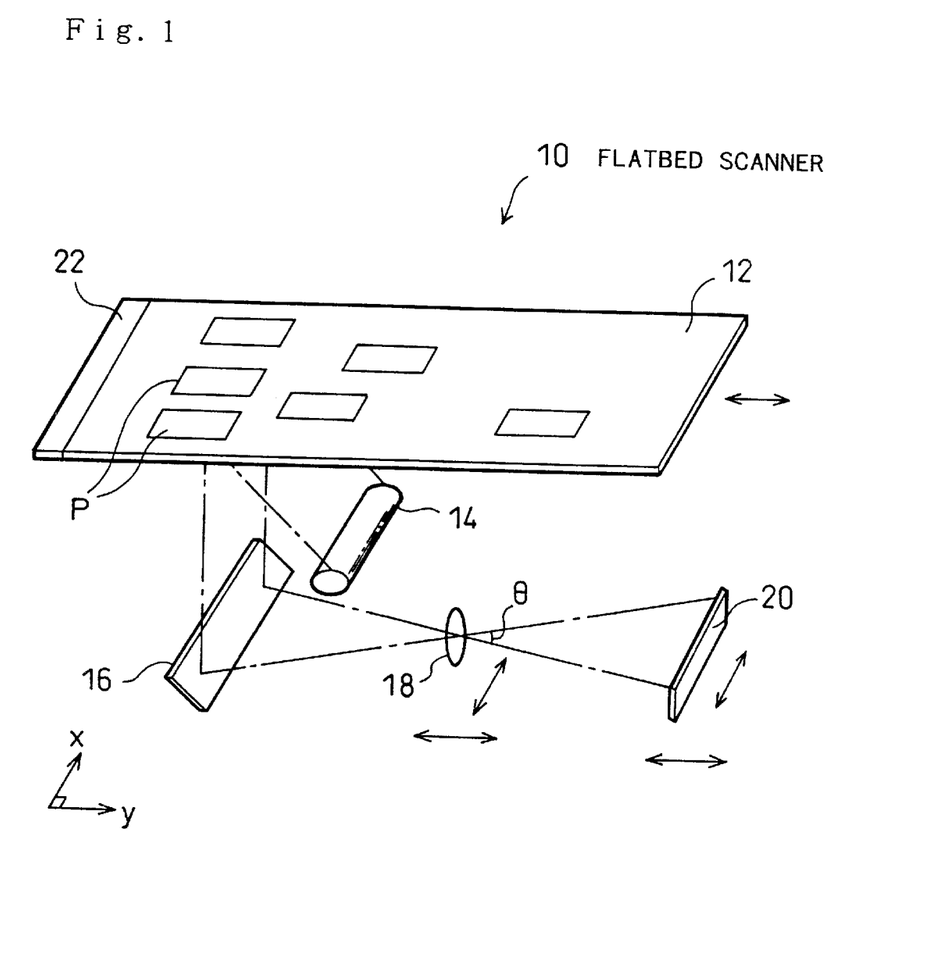
FIG. 1 schematically illustrates internal structure of a flatbed scanner 10 embodying the present invention.

FIG. 1 schematically illustrates internal structure of a flatbed scanner 10 embodying the present invention. The flatbed scanner 10 includes an original tray 12 horizontally moving in a y direction (referred to herein as, a secondary scanning direction). A fluorescent lamp (light source) 14 is disposed below the horizontally-moving original tray 12 to extend in a direction perpendicular to the moving direction (an x direction in FIG. 1: referred to herein as, a primary scanning direction). Light emitted from the light source 14 reflects from originals P set on the original tray 12 and impinges on a line of CCDs (charge-coupled devices) 20 with R, G, and B color filters via a mirror 16 and a lens 18 to be converted to electrical signals. As the original tray 12 moves in the secondary scanning direction 'y', the images of the originals P set on the original tray 12 are read as the electrical signals.

In the flatbed scanner 10, the lens 18 and the line of CCDs 20 are movable in the y direction. Moving either one or both of the lens 18 and the line of CCDs 20 in the y direction regulates an angle of view θ that is possibly shot in the line of CCDs 20 by the lens 18 (hereinafter referred to as the scanning angle of the line of CCDs 20). By way of example, the scanning angle θ of the line of CCDs 20 is extended (widened) by moving the line of CCDs 20 toward the lens 18 (that is, -y direction) while the lens 18 is fixed. Alternatively the scanning angle θ of the line of CCDs 20 is extended (widened) by moving the lens 18 toward the line of CCDs 20 (that is, y direction) while the line of CCDs 20 is fixed.

Both the lens 18 and the line of CCDs 20 are also movable in the x direction. Integrally moving the lens 18 and the line of CCDs 20 in the direction x without changing their positional relationship shifts the possible shooting range of the originals P in the line of CCDs 20 in the x direction.

A white reference plate 22 is arranged on one end of the original tray 12 (the first end in the moving direction) for generating white reference data used in shading correction. The white reference plate 22 is a board member having the surface homogeneously painted in white, and gives the white reference data as output signals of the line of CCDs 20 corresponding to a white reference density of the white reference plate 22.

Figure 2:
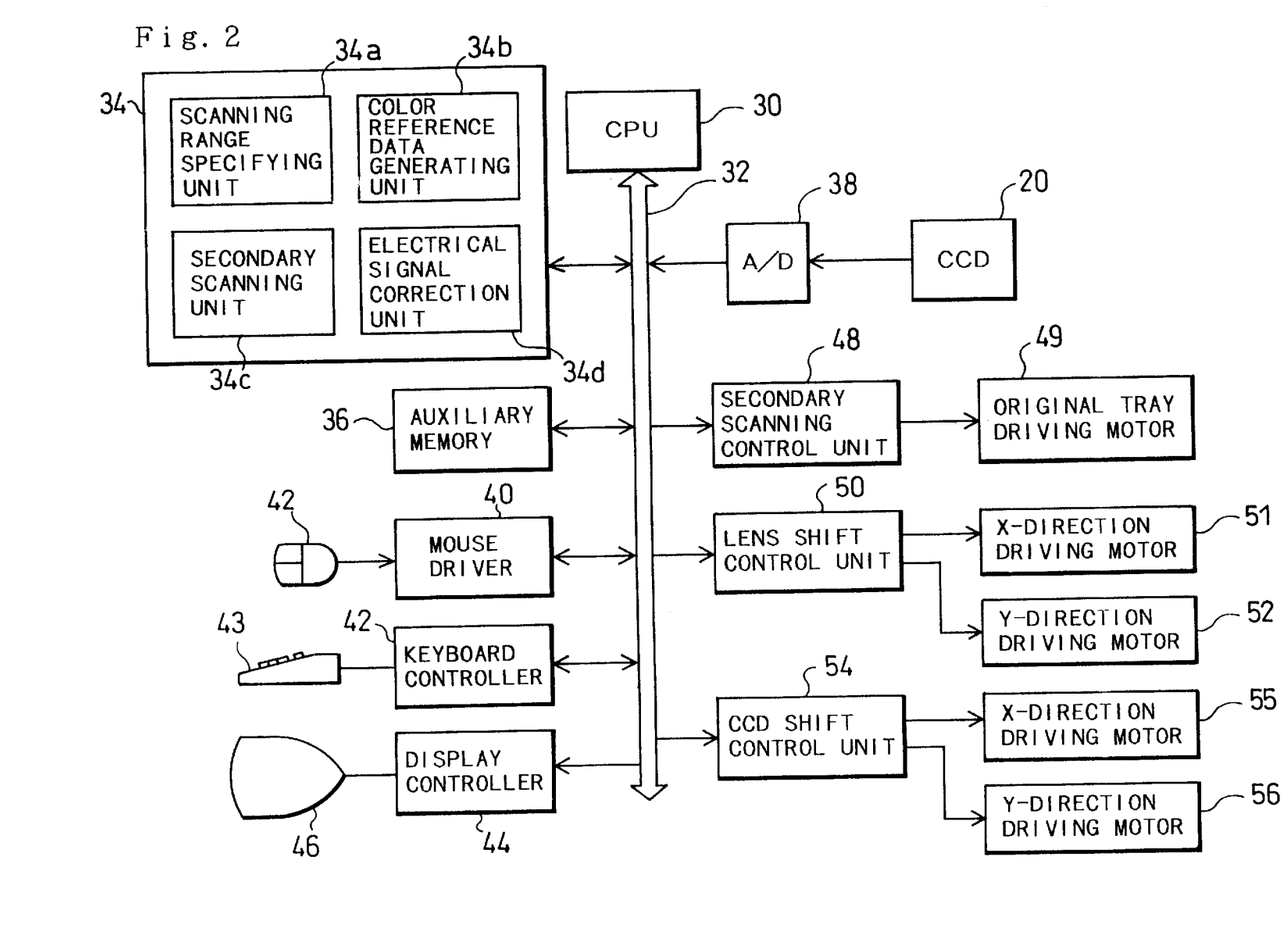
FIG. 2 is a block diagram illustrating electrical structure of the flatbed scanner 10.

FIG. 2 is a block diagram illustrating electrical structure of the flatbed scanner 10. The flatbed scanner 10 includes a CPU 30 and a bus line 32 as well as the following components connected to the CPU 30 via the bus line 32:

a main memory 34 for storing processing programs and working data (The processing programs are executed by the CPU 30 to realize the functions of a scanning range specifying unit 34a, a color reference data generating unit 34b, a secondary scanning unit 34c, and an electrical signal correction unit 34d);

an auxiliary memory 36 for storing image data of scanned originals and other data used for the processing;

an A/D converter 38 for converting analog signals input from the line of CCDs 20 to digital signals;

a mouse driver 40 for driving a mouse 41 functioning as a pointing device;

a keyboard controller 42 for outputting signals in response to operation of a keyboard 43;

a display controller 44 for controlling display of color images on a color monitor 46;

a secondary scanning control unit 48 for outputting control signals to an original tray driving motor 49 that shifts the original tray 12 in the secondary scanning direction 'y';

a lens shift control unit 50 for outputting control signals to an X-direction driving motor 51 and a Y-direction driving motor 52 that respectively shift the lens 18 in the x direction and in the y direction; and a CCD shift control unit 54 for outputting control signals to an X-direction driving motor 55 and a Y-direction driving motor 56 that respectively shift the line of CCDs 20 in the x direction and in the y direction.

The original tray driving motor 49 is a stepping motor that is driven and rotated in response to a pulse signal or control signal output from the secondary scanning control unit 48. The X-direction driving motor 51, the Y-direction driving motor 52, the X-direction driving motor 55, and the Y-direction driving motor 56 are also stepping motors that are driven and rotated in response to pulse signals or control signals respectively output from the lens shift control unit 50 and the CCD shift control unit 54.

Figure 3:
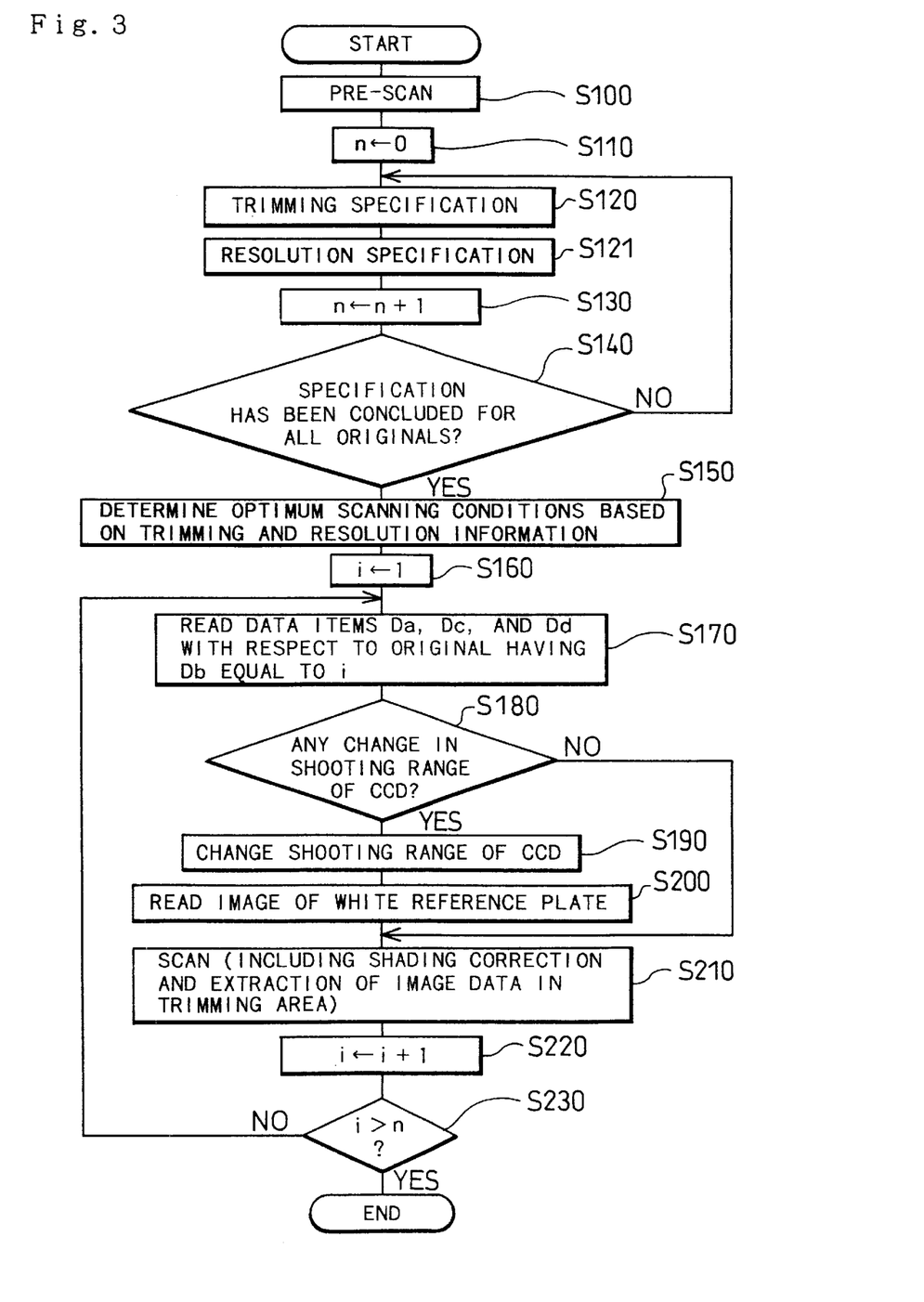
FIG. 3 is a flowchart showing an original image scanning routine executed by the CPU 30 of the flatbed scanner 10.

The CPU 30 of the flatbed scanner 10 thus constructed executes an original image scanning routine shown in the flowchart of FIG. 3.

When the program enters the routine of FIG. 3, the CPU 30 first carries out a pre-scan process, which scans the whole original tray 12 at a low resolution, at step S100. In the pre-scan process, while the secondary scanning control unit 48 outputs a control signal to the original tray driving motor 49 to shift the original tray 12 in the secondary scanning direction 'y', the CPU 30 inputs electrical signals representing the image of the original tray 12 from the line of CCDs 20 via the A/D converter 38. The scanning angle θ of the line of CCDs 20 is set in a range that can shoot the entire width of the original tray 12 in the primary scanning direction 'x'. One scan of the line of CCDs 20 in the secondary scanning direction 'y' enables input of the whole image of the original tray 12.

The CPU 30 initializes a variable 'n' (which variable counts) for counting the number of trimming areas (discussed later), to zero at step S110. The CPU 30 subsequently carries out trimming specification with respect to the image of each original P set on the original tray 12 using the image data obtained by the pre-scan process at step S120. In the process of trimming specification, the image data obtained by the pre-scan process are displayed on the color monitor 46. The operator specifies two points on a diagonal in the image of the original P with the mouse 41 on the display of the color monitor 46, and the CPU 30 stores a range defined by the specified two points as a trimming area.

The CPU30 then specifies a resolution with respect to the original P for which the trimming specification has been carried out, at step S121. For example, the operator may directly input a value representing the resolution from the keyboard 43. In another example the operator inputs a desired output size of the original P from the keyboard 43 and the CPU 30 calculates the resolution from the desired output size and the size of the trimming area specified at step S120.

After the specification of the trimming area and the resolution has been concluded for an arbitrary original P on the original tray 12 at steps S120 and S121 the variable 'n' is incremented by one at step S130. It is then determined at step S140 whether or not the specification of the trimming area and the resolution at steps S120 and S121 has been concluded for all the originals P. When it is determined at step S140 that the specification has not yet been concluded for all the originals P, the program returns to step S120 and repeats the specification for the image of another original P. When it is determined at step S140 that the specification has been concluded for all the originals P, the program proceeds to step S150.

Figure 4:
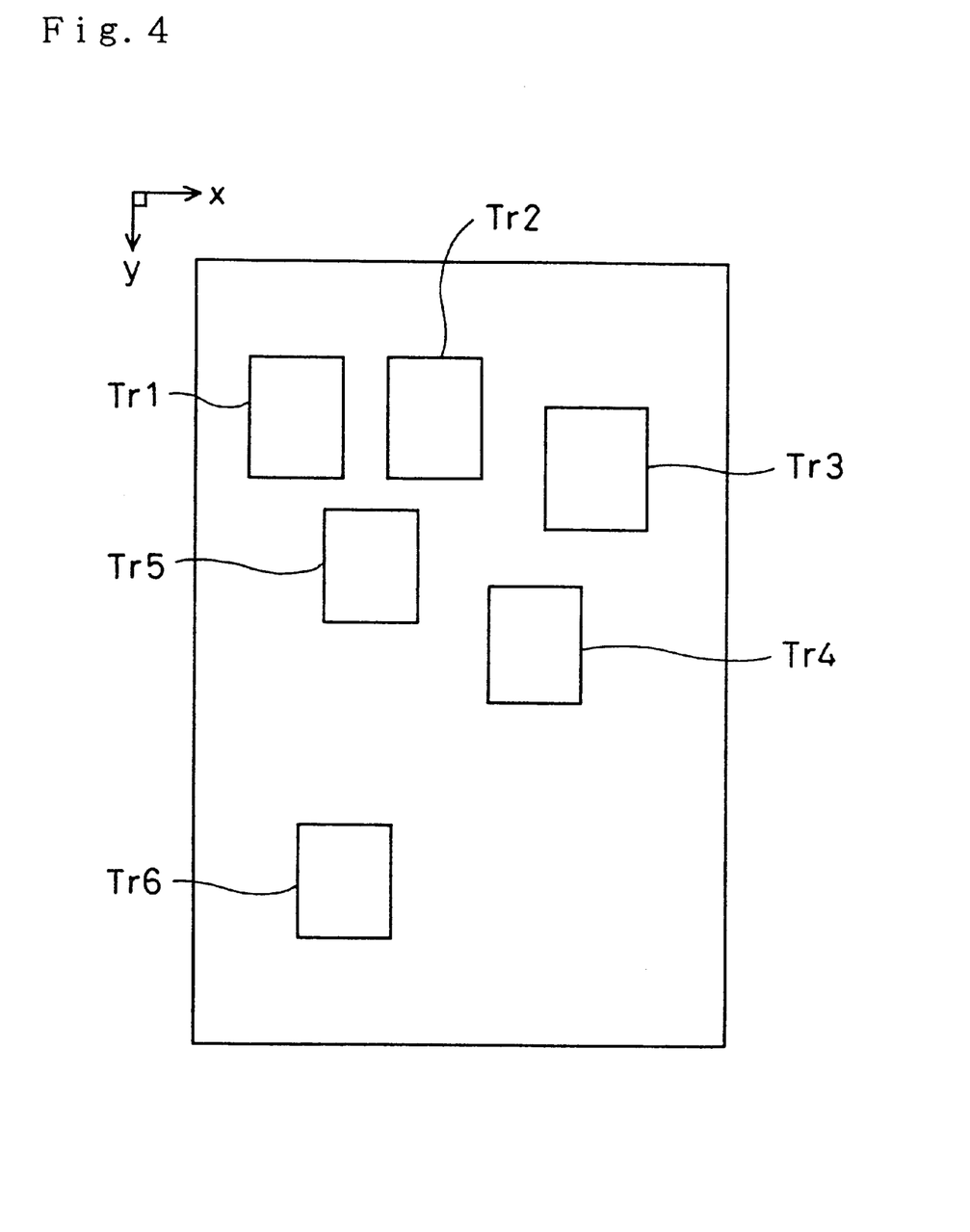
FIG. 4 illustrates an image of the original tray 12 after the trimming specification has been completed for all the originals P.

FIG. 4 illustrates an image of the original tray 12 after the trimming specification has been completed for all the originals P. In this example, six trimming areas Tr1 through Tr6 have been specified corresponding to the number of the originals P.

At step S150 in the flowchart of FIG. 3, the CPU 30 obtains optimum scanning conditions for scanning the originals P, based on the information of the trimming areas and resolutions specified at step S120 and S130. The scanning conditions define the sequence of scanning the originals P and the shooting range of the line of CCDs 20 in the primary scanning direction 'x'. The processing of step S150 determines the optimum scanning conditions that enable each original P to be scanned at a preset scanning resolution and minimize the movements of the line of CCDs 20 and the lens 18 in the primary scanning direction 'x'.

Figure 5:
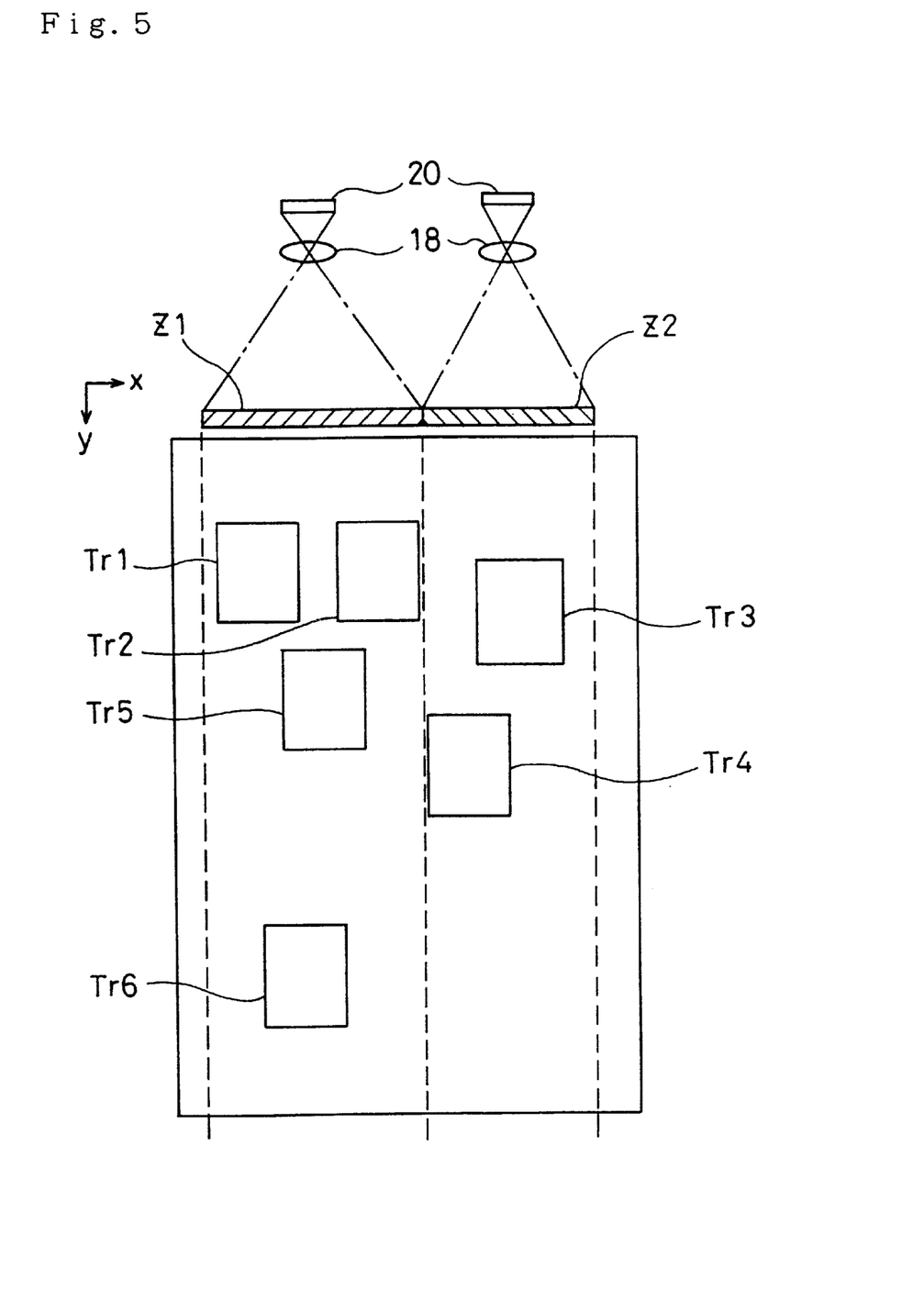
FIG. 5 shows the relationship between trimming areas Tr1 through Tr6 and a possible shooting range of a line of CCDs 20 in a primary scanning direction 'x'.

FIG. 5 shows the relationship between the trimming areas Tr1 through Tr6 and the possible shooting range of the line of CCDs 20 in the primary scanning direction 'x'. When the first through the sixth trimming areas Tr1 through Tr6 are specified as illustrated in FIG. 5, the first, the second, the fifth, and the sixth trimming areas Tr1, Tr2, Tr5, and Tr6 are within a first shooting range Z1 of the line of CCDs 20. More specifically, these four trimming areas Tr1, Tr2, Tr5, and Tr6 are included in the length of the first shooting range Z1 extending rightward from the left-most end of the first trimming area Tr1 existing on the left-most position and are shot simultaneously. The third and the fourth trimming areas Tr3 and Tr4 are within a second shooting range Z2 of the line of CCDs 20. The first shooting range Z1 and the second shooting range Z2 are set when the position of the lens 18 and the line of CCDs 20 is adjusted to enable the originals in the shooting ranges Z1 and Z2 to be scanned at the maximum scanning resolution specified for the respective originals. The higher scanning resolution generally narrows the shooting range. The first and the second shooting ranges Z1 and Z2 are accordingly the narrowest shooting ranges for scanning the trimming areas Tr1, Tr2, Tr5, and Tr6 in the range Z1 and the trimming areas Tr3 and Tr4 in the range Z2.

Referring back to the flowchart of FIG. 3, at step S150, the CPU 30 sets the first shooting range Z1 for scanning the first, the second, the fifth, and the sixth trimming areas Tr1, Tr2, Tr5, and Tr6 and the second shooting range Z2 for scanning the third and the fourth trimming areas Tr3 and Tr4. The CPU 30 further specifies the sequence of scanning the images of the trimming areas in the respective shooting ranges Z1 and Z2. In accordance with a concrete example, the CPU 30 specifies a scanning sequence as the first, the second, the fifth, and the sixth trimming areas Tr1, Tr2, Tr5, and Tr6 in the first shooting range Z1 and a scanning sequence as the third and the fourth trimming areas Tr3 and Tr4 in the second shooting range Z2. Namely the specified order of scanning images goes as the first, the second, the fifth, the sixth, the third, and the fourth trimming areas Tr1, Tr2, Tr5, Tr6, Tr3, and Tr4.

Figure 6:
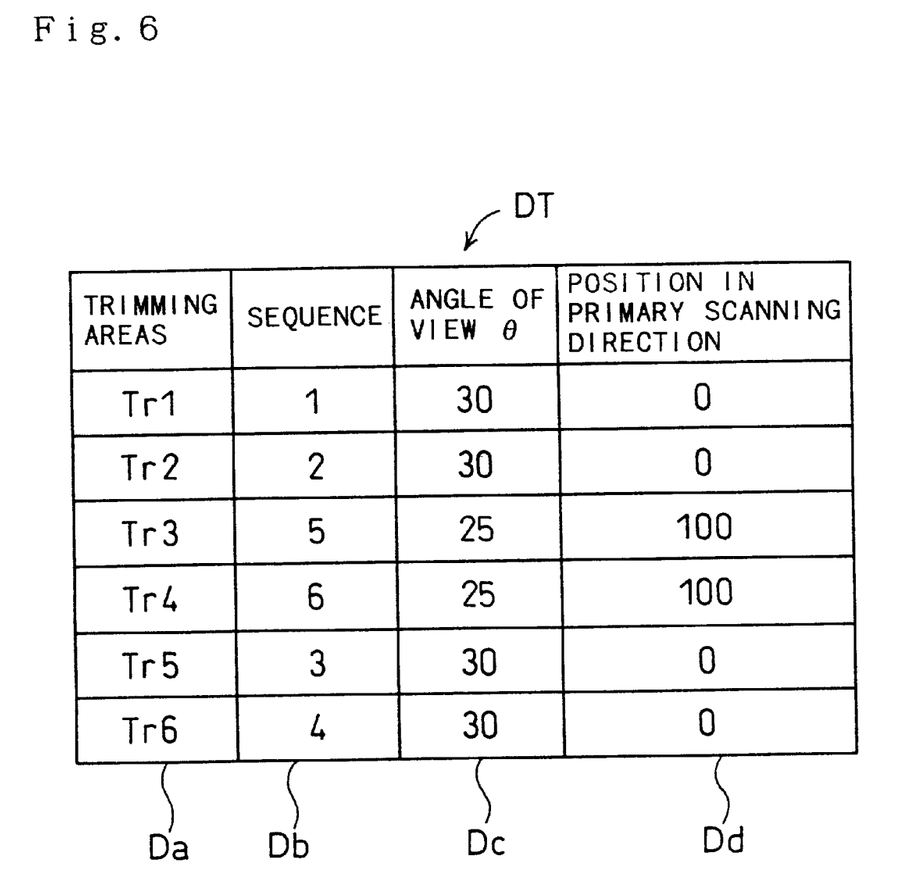
FIG. 6 shows structure of scan condition data DT representing scanning conditions.

These preset scanning conditions are stored in a data structure given below in the main memory 34. FIG. 6 shows structure of scan condition data DT representing the scanning conditions. The scan condition data DT includes the following data items Da through Dd prepared for each original:

(1) data item Da representing the trimming areas Tr1 through Tr6 corresponding to the respective originals;

(2) data item Db representing a preferential number allocated to each original to define the scanning sequence;

(3) data item Dc representing the scanning angle θ of the line of CCDs 20; and (4) data item Dd representing the position of the line of CCDs 20 and the lens 18 in the primary scanning direction 'x' when each original is scanned.

The value of the data item Dd defines the position of a given part (for example, an end) of the line of CCDs 20 and the lens 18 as a displacement from a fixed position. The data items Dc and Dd determine the possible shooting range of the line of CCDs 20 in the primary scanning direction 'x'.

Referring back again to the flowchart of FIG. 3, after specifying the optimum scanning conditions for each original at step S150, the CPU 30 sets a variable 'i' equal to one at step S160. At subsequent step S170, the CPU 30 reads the data items Da, Dc, and Dd with respect to an original having the data item Db equal to the preset variable 'i', that is, an i-th original, to which a preferential number 'i' has been allocated, using the data item Db of the scan condition data DT specified at step S150 as a retrieval key. It is then determined at step S180 whether or not the current values of the data items Dc and Dd are different from the previous values subjected to the determination in the previous cycle of this step, that is, whether or not there is any change in the shooting range of the line of CCDs 20.

When it is determined at step S180 that at least either one of the current values of the data items Dc and Dd has been changed, that is, there is any change in the shooting range of the line of CCDs 20, the CPU 30 changes the shooting range of the line of CCDs 20 in the primary scanning direction 'x' at step S190. In accordance with a concrete example, the CPU 30 determines control amounts of the lens 18 and the line of CDs 20 required for realizing the angle of view θ defined by the data item Dc read at step S170 (either one of the control amounts may be equal to zero) and outputs control signals representing the required control amounts to the lens shift control unit 50 and the CCD shift control unit 54, so as to shift either one or both of the lens 18 and the line of CCDs 20 by predetermined distances in the secondary scanning direction 'y'. This process adjusts the scanning angle θ of the line of CCDs 20 to the value defined by the data item Dc. The CPU 30 also outputs control signals representing control amounts based on the data item Dd read at step S170 to the lens shift control unit 50 and the CCD shift control unit 54, so as to shift the lens 18 and the line of CCDs 20 in the primary scanning direction 'x' by predetermined distances corresponding to the value of the data item Dd. This process moves the shooting range of the line of CCDs 20 in the primary scanning direction 'x' by a desired amount.

At step S190, the CPU 30 specifies the scanning angle θ of the line of CCDs 20 and the position in the primary scanning direction 'x' of the shooting range defined by the scanning angle θ. This procedure changes the possible shooting range of the line of CCDs 20 in the primary scanning direction 'x' to a desired position.

The program then proceeds to step S200 to read the image of the white reference plate 22. In accordance with a concrete procedure, in response to a predetermined control signal output from the secondary scanning control unit 48 to the original tray driving motor 49, the shooting position of the line of CCDs 20 is shifted to the position of the white reference plate 22. The CPU 30 receives electrical signals representing the image of the white reference plate 22 input from the line of CCDs 20 via the A/D converter 38. The shooting range of the line of CCDs 20 in the primary scanning direction 'x' at this moment is fixed to the desired shooting range specified at step S190. The input image of the white reference plate 22 is stored, as white reference data into the main memory 34.

The CPU 30 subsequently goes to step S210. When it is determined at step S180 that neither of the data items Dc and Dd has been changed, that is, there is no change in the shooting range of the line of CCDs 20, the program skips the processing of steps S190 and S200 and proceeds to step S210. At step S210, the CPU 30 scans the trimming area defined by the data item Da read at step S170. In accordance with an exemplary procedure, the secondary scanning control unit 48 outputs a control signal corresponding to the trimming area defined by the data item Da to the original tray driving motor 49, and the line of CCDs 20 scans the range in the secondary scanning direction 'y' specified by the trimming area. The CPU 30 accordingly receives electrical signals representing the image of the trimming area input from the line of CCDs 20 via the A/D converter 38.

At step S210, the CPU 30 also carries out shading correction of the image data input from the line of CCDs 20. The shading correction calculates a scatter in the respective elements of the line of CCDs 20 and equalizes the outputs of the respective elements. The image data taken by the line of CCDs 20 are corrected with the white reference data stored in the main memory 34 at step S200. The shading correction is a known technique to the skilled in the art and is thus not specifically described here. The shading correction corrects the image data taken by the line of CCDs 20 by each one line in the primary scanning direction.

At step S210, the CPU 30 further extracts a part corresponding to the trimming area, that is a part of the range in the primary scanning direction 'x' defined by the trimming area, in question from the image data of one line in the primary scanning direction 'x' after the shading correction, and stores the extracted data part into the main memory 34.

Figures 7A, 7B, 7C, 7D:
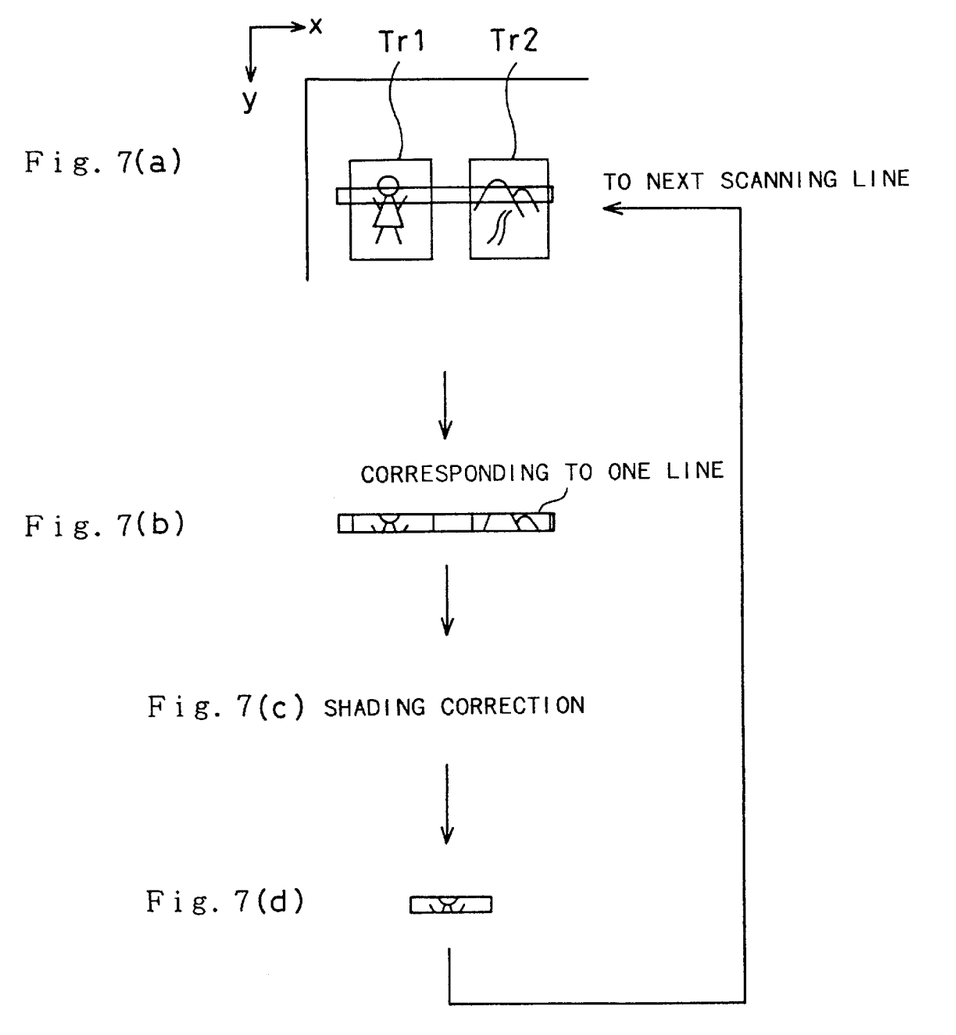
FIGS. 7(a)–7(d) show an outline of the scanning process carried out in the original image scanning routine.

FIG. 7 shows an outline of the processing carried out at step S210. The processing first moves the shooting range of the line of CCDs 20 to a desired position in the secondary scanning direction 'y' as shown in FIG. 7(a). In this state, the shooting range of the line of CCDs 20 in the primary scanning direction 'x' includes the plurality of trimming areas Tr1 and Tr2 as clearly understood from FIG. 7(a). The processing then takes image data of one line in the primary scanning direction 'x' at the desired position in the secondary scanning direction 'y' as shown in FIG. 7(b) and stores the image data of one line into the main memory 34. The processing subsequently carries out shading correction for the image data of one line shown in FIG. 7(c), extracts a part corresponding to the i-th trimming area from the image data of one line in the primary scanning direction 'x' after the shading correction as shown in FIG. 7(d), and stores the extracted data part into the main memory 34.

The shooting range of the line of CCDs 20 is then shifted by one line in the secondary scanning direction 'y', and the processing of FIGS. 7(a) through 7(d) is repeated for the new line. This processing is repeated until the shooting range of the line of CCDs 20 exceeds the trimming area in the secondary scanning direction 'y'. This enables image data representing an image in the trimming area having the i-th preferential number to be stored into the main memory 34.

Referring back to the flowchart of FIG. 3, the CPU 30 increments the variable 'i' by one at step S220 and determines at step S230 whether or not the variable 'i' is greater than the variable 'n' set at step S130. When the variable 'i' is not greater than the variable 'n', the program returns to step S170 and repeats the processing of steps S170 through S210 for a next trimming area having a next preferential number. When it is determined at step S230 that the variable 'i' is greater than the variable 'n', the program goes to END and exits from this routine.

This original image scanning process is applied to scan a plurality of originals P set on the original tray 12 in the following manner. As described previously, the original image scanning process specifies, for example, the six trimming areas Tr1 through Tr6 shown in FIG. 4. The concrete procedure of the image scanning process is discussed below in an example of the six trimming areas Tr1 through Tr6 thus specified. The process first reads the white reference data representing the image of the white reference plate 22 taken in the first shooting range Z1 shown in FIG. 5 by the line of CCDs 20. The process then reads an image in the first trimming area Tr1 taken in the first shooting range Z1 by the line of CCDs 20. The process subsequently reads an image in the second trimming area Tr2 while not changing the shooting range of the line of CCDs 20 in the primary scanning direction 'x', that is, fixing the shooting range to the first shooting range Z1. The process then reads images in the fifth trimming area Tr5 and in the sixth trimming area Tr6 while fixing the shooting range to the first shooting range Z1.

The shooting range of the line of CCDs 20 in the primary scanning direction 'x' is then changed to the second shooting range Z2 shown in FIG. 5. The process first reads the white reference data representing the image of the white reference plate 22 taken in the second shooting range Z2, subsequently reads an image in the third trimming area Tr3 taken in the second shooting range Z2, and then reads an image in the fourth trimming area Tr4 while fixing the shooting range to the second shooting range Z2.

In the flatbed scanner 10 of the embodiment, the process of scanning the white reference plate 22 and updating the white reference data is required only once for correcting the image data of the four originals in the first, the second, the fifth, and the sixth trimming areas Tr1, Tr2, Tr5, and Tr6. Similarly the same process is required only once for correcting the image data of the two originals in the third and the fourth trimming areas Tr3 and Tr4. Namely the process of scanning the white reference plate 22 and updating the white reference data is required only once for correcting the image data of two or more originals. This effectively reduces the generating cycles of the white reference data used for correcting the sensitivities of the line of CCDs 20 to be less than the number of the originals P, thereby shortening the total time required for scanning the images of the plurality of originals P set on the original tray 12.

The flatbed scanner 10 of the embodiment does not simultaneously scan a plurality of originals included in one shooting range of the line of CCDs 20 in the primary scanning direction, for example, four originals specified by the first, the second, the fifth, and the sixth trimming areas Tr1, Tr2, Tr5, and Tr6, but individually scans each of the originals. The required capacity of the main memory 34 for storing the image data thus corresponds to the size of the image data of the largest original. This favorably saves the memory resource.

The structure of the embodiment individually scans each of a plurality of originals in the secondary scanning direction. One modified structure, however, simultaneously scans a plurality of originals in the secondary scanning direction. This modified structure requires a greater capacity of the memory for storing image data, but shortens the total time required for scanning the images.

In the structure of the embodiment, the color reference data generating unit 34b generates the white reference data from the white reference plate 22. Another possible structure generates black reference data from a black reference plate and carries out shading correction with the black reference data. Still another possible structure carries out shading correction with both the white reference data and the black reference data.

The structure of the embodiment reads image signals representing the originals P set on the original tray 12 from the line of CCDs 20, which receives the light emitted from the light source 14 and reflected from the originals P set on the original tray 12. One modified structure reads image signals from the line of CCDs 20, which receives the light transmitted through the originals P.

In the above embodiment, both the first and the second shooting ranges Z1 and Z2 include a plurality of originals. As the result of the specification of the optimum scanning conditions at step S150, however, either one of the first and the second shooting ranges Z1 and Z2 may include a plurality of originals, while the other may include only one original.

The present invention is not restricted to the above embodiment, but there may be many modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. An image scanning apparatus for optically scanning images of a plurality of originals set on an original tray, said image scanning apparatus comprising:

a light source which illuminates each of said originals;

a lens which condenses light from said each original to condensed light;

a linear image sensor which has a plurality of light-receiving elements arranged in a primary scanning direction to convert the condensed light into an electric signal;

a scanning angle variation unit which varies a scanning angle of said linear image sensor;

a primary scanning range setting unit which adjusts relative positions of said lens, said linear image sensor and said original tray in the primary scanning direction, so as to set a primary scanning range of said linear image sensor on said original tray;

an original specification unit which specifies pieces of information representing a scanning resolution and a scanning range on said original tray with regard to each of said plurality of originals set on said original tray;

a scanning conditions computation unit which computes scanning conditions with regard to each of said plurality of originals set on said original tray, based on the information specified by said original specification unit, the scanning conditions including the scanning angle of said linear image sensor and relative positions of said lens, said linear image sensor and said original tray in the primary scanning direction;

a storage unit which stores the scanning conditions with regard to each of said originals;

a scanning sequence specification unit which specifies a scanning sequence of said plurality of originals set on said original tray;

a control unit which reads from said storage unit the scanning conditions with regard to each of said originals when the scanning of said each original specified by said scanning sequence specification unit is to be performed, and controls said scanning angle variation unit and said primary scanning range setting unit to change the scanning conditions; and a secondary-scan shifting unit which relatively shifts said original tray in a secondary-scanning direction, which is perpendicular to the primary scanning direction, while the scanning conditions changed by said control unit are kept.

2. An image scanning apparatus in accordance with claim 1, wherein said scanning sequence specification unit specifies the scanning sequence to minimize a frequency of adjustment of the relative positions of said lens and said linear image sensor to said original tray in the primary scanning direction by said primary scanning range setting unit.

3. An image scanning apparatus in accordance with claim 2, wherein said scanning sequence specification unit comprises:

a pre-scan unit which scans an image area encompassing all said plurality of originals set on said original tray at a predetermined resolution, a display which displays pre-scan images of said plurality of originals; and a pointing device for allowing a user to specify on said display a diagonal line of each of said originals set on said original tray.

4. An image scanning apparatus in accordance with claim 1, wherein said original tray has a specific shape which allows said plurality of originals to be arranged in a two-dimensional manner.

5. An image scanning apparatus in accordance with claim 1, said image scanning apparatus further comprising:

a color reference previously set in the vicinity of said original tray;

a color reference data generating unit which receives an output signal of said linear image sensor with regard to the color reference every time the scanning conditions are changed by said control unit, and generates color reference data for correcting sensitivity of each of said light-receiving elements included in said linear image sensor on the basis of the output signal; and an electric signal correction unit which corrects the electric signal output from said linear image sensor with the color reference data while said original tray is shifted in the secondary-scanning direction.

6. An image scanning apparatus for optically scanning an image of an original set on an original tray, said image scanning apparatus comprising:

a light source which illuminates said original;

a lens which condenses light from said original to condensed light;

a linear image sensor which has a plurality of light-receiving elements arranged in a primary scanning direction to convert the condensed light into an electric signal;

a scanning angle variation unit which varies a scanning angle of said linear image sensor;

a primary scanning position variation unit which integrally adjusts relative positions of said lens, said linear image sensor and said original tray in the primary scanning direction;

an original specification unit which specifies pieces of information representing a scanning resolution and a scanning range on said original tray with regard to said original set on said original tray;

a scanning conditions computation unit which computes scanning conditions with regard to said original set on said original tray, based on the information specified by said original specification unit, the scanning conditions including the scanning angle of said linear image sensor and relative positions of said lens, said linear image sensor and said original tray in the primary scanning direction;

a control unit which controls said scanning angle variation unit and said primary scanning angle variation unit and said primary scanning position variation unit to change current scanning conditions to the scanning conditions computed by said scanning conditions computation unit; and a secondary-scan shifting unit which relatively shifts said original tray in a secondary-scanning direction, which is perpendicular to the primary scanning direction, while the scanning conditions changed by said control unit are kept.

* * * * *